(12) United States Patent
Zhong et al.

(10) Patent No.: US 11,803,111 B2
(45) Date of Patent: Oct. 31, 2023

(54) PROJECTOR AND METHOD FOR CONTROLLING A PROJECTOR TO POWER ON OR OFF

(71) Applicant: CHENGDU XGIMI TECHNOLOGY CO LTD, Sichuan (CN)

(72) Inventors: Bo Zhong, Sichuan (CN); Shi Xiao, Sichuan (CN); Xin Wang, Sichuan (CN); Xiaoxiang Gu, Sichuan (CN)

(73) Assignee: CHENGDU XGIMI TECHNOLOGY CO LTD, Chengdu (CN)

( * ) Notice: Subject to any disclaimer, the term of this patent is extended or adjusted under 35 U.S.C. 154(b) by 155 days.

(21) Appl. No.: 17/600,145

(22) PCT Filed: Mar. 13, 2020

(86) PCT No.: PCT/CN2020/079195
§ 371 (c)(1),
(2) Date: Sep. 30, 2021

(87) PCT Pub. No.: WO2021/128598
PCT Pub. Date: Jul. 1, 2021

(65) Prior Publication Data
US 2022/0206370 A1 Jun. 30, 2022

(30) Foreign Application Priority Data
Dec. 25, 2019 (CN) .......................... 201911360471.2

(51) Int. Cl.
*G03B 21/14* (2006.01)
*H04N 9/31* (2006.01)
*G03B 21/16* (2006.01)

(52) U.S. Cl.
CPC ......... *G03B 21/145* (2013.01); *G03B 21/142* (2013.01); *G03B 21/16* (2013.01)

(58) Field of Classification Search
CPC ..... G03B 21/145; G03B 21/14; H04N 9/3141
See application file for complete search history.

(56) References Cited

U.S. PATENT DOCUMENTS

2011/0248983 A1  10/2011  Kim et al.
2019/0361328 A1  11/2019  Chen

FOREIGN PATENT DOCUMENTS

CN      101030021 A    9/2007
CN      201 4387 95 U  4/2010
(Continued)

OTHER PUBLICATIONS

The First Office Action for Chinese Application No. 201911360471. 2, dated Sep. 2, 2020, 22 pages.
(Continued)

*Primary Examiner* — Ryan D Howard
(74) *Attorney, Agent, or Firm* — East IP P.C.

(57) ABSTRACT

The present application provides a projector, including: a projector cabin; an opto-mechanical lens arranged at one end of the projector cabin; a sliding cover arranged in front of the opto-mechanical lens; a target sensor configured to collect signals from one end of the projector cabin where the opto-mechanical lens is arranged and one end of the projector cabin away from the opto-mechanical lens; and a driving mainboard connected to the target sensor and configured to control a working state of the projector based on the signals, wherein the working state includes a power-on state and a power-off state.

8 Claims, 3 Drawing Sheets

(56) References Cited

FOREIGN PATENT DOCUMENTS

| | | |
|---|---|---|
| CN | 202 9042 06 U | 4/2013 |
| CN | 205 01 55 95 U | 2/2016 |
| CN | 1062273 53 A | 12/2016 |
| CN | 107 5665 55 A | 1/2018 |
| CN | 207 2162 46 U | 4/2018 |
| CN | 208 2397 79 U | 12/2018 |
| CN | 208 2854 50 U | 12/2018 |
| CN | 109 5404 65 A | 3/2019 |
| JP | 200 1249 402 A | 9/2001 |
| JP | 200 6078 76 1 A | 3/2006 |
| JP | 200 6201 646 A | 8/2006 |
| JP | 200 9042 507 A | 2/2009 |
| JP | 201 0226 699 A | 10/2010 |

OTHER PUBLICATIONS

The Second Office Action for Chinese Application No. 201911360471. 2, dated Feb. 4, 2021, 27 pages.
The First Office Action for Japan Application No. 2021-554652, dated Oct. 4, 2022, 10 pages.
The International search report for PCT Application No. PCT/CN2020/0791 95, dated Sep. 9, 2020, 7 pages.

PROJECTOR AND METHOD FOR CONTROLLING A PROJECTOR TO POWER ON OR OFF

CROSS-REFERENCE TO RELATED APPLICATIONS

The present application is a National Stage of International Application No. PCT/CN2020/079195, filed on Mar. 13, 2020, which claims priority to Chinese Patent Application No. 201911360471.2 filed on Dec. 25, 2019, titled "PROJECTOR AND METHOD FOR CONTROLLING A PROJECTOR TO POWER ON OR OFF", both of the applications are incorporated herein by reference in their entirety.

TECHNICAL FIELD

The present application relates to the technical field of projectors, and in particular, to a projector and a method for controlling a projector to power on or off.

BACKGROUND

Methods for controlling a projector to power on or off all have a problem of false triggering, especially for a portable product which itself has a battery for power supply. When a user places the projector in a small space such as in a bag, for example, items in the bag rub or squeeze each other, which can easily trigger the projector to power on. For the projector, heat dissipation environment in the bag is poor, and thus powering on not only wastes power, but also has a safety hazard. From a security perspective, abnormal power-on conditions must be considered. In related technology, a button or remote control is used to trigger or control the projector to power on or off. The button is easy to be triggered by pressing in the bag, which cannot be avoided. If a fool-proof design is added, for example, the projector is triggered to power on by pressing the button twice consecutively or pressing the button for a long time, although the problem can be solved, user experience is poor under normal use.

Therefore, how to provide a solution to the above-mentioned technical problem is a problem that needs to be solved by those skilled in the art at present.

SUMMARY

A purpose of the present application is to provide a projector and a method for controlling a projector to power on or off. The specific solutions is as follows.

The present application provides a projector, including: a projector cabin; an opto-mechanical lens arranged at one end of the projector cabin; a sliding cover arranged in front of the opto-mechanical lens; a target sensor configured to collect signals from one end of the projector cabin where the opto-mechanical lens is arranged and one end of the projector cabin away from the opto-mechanical lens; and a driving mainboard connected to the target sensor and configured to control a working state of the projector based on the signals, wherein the working state includes a power-on state and a power-off state.

Optionally, the target sensor is a ranging sensor and includes three components, wherein any two of the components are arranged in a preset range from two sides of the opto-mechanical lens respectively, the last component is arranged at one end of the projector cabin away from the opto-mechanical lens, and the three components are a signal transmitting tube, a first signal receiving tube, and a second signal receiving tube.

Correspondingly, the driving mainboard is configured to: when the signal transmitting tube transmits a preset signal, control the working state based on detecting whether the preset signal is received by the first signal receiving tube and the second signal receiving tube.

Optionally, the signal transmitting tube and the first signal receiving tube are arranged in the preset range from two sides of the opto-mechanical lens respectively, and the second signal receiving tube is arranged at one end of the projector cabin away from the opto-mechanical lens.

Correspondingly, the driving mainboard is configured to: when the signal transmitting tube transmits the preset signal, control the projector to be in the power-on state under a condition that it is detected that the preset signal is received by the first signal receiving tube, and control the projector to be in the power-off state under a condition that it is detected that the preset signal is not received by the first signal receiving tube.

Optionally, a length of the sliding cover is smaller than a corresponding distance between the second signal receiving tube and a component with a closest horizontal distance to the second signal receiving tube.

Optionally, the driving mainboard is configured to: under a condition that it is detected that the preset signal is received by the first signal receiving tube and the preset signal is not received by the second signal receiving tube, determine whether a distance corresponding to the preset signal received by the first signal receiving tube is greater than a preset distance, and control the projector to be in the power-on state under a condition that the distance is greater than the preset distance.

Optionally, the first signal receiving tube and the second signal receiving tube are arranged in the preset range from two sides of the opto-mechanical lens respectively, and the signal transmitting tube is arranged at one end of the projector cabin away from the opto-mechanical lens.

Correspondingly, the driving mainboard is configured to: when the signal transmitting tube transmits the preset signal, control the projector to be in the power-off state under a condition that it is detected that the preset signal is not received by the first signal receiving tube or the second signal receiving tube, and control the projector to be in the power-on state under a condition that it is detected that the preset signal is received by both the first signal receiving tube and the second signal receiving tube and the sliding cover does not block the signal transmitting tube.

Optionally, the signal transmitting tube is an infrared transmitter, a laser transmitter, or a millimeter wave radar transmitter.

Optionally, the target sensor is a ranging sensor and includes a signal receiver and a signal transmitter, and the signal receiver and the signal transmitter are arranged in a preset range from two sides of the opto-mechanical lens respectively.

Correspondingly, the driving mainboard is configured to: when the signal transmitter transmits a target signal, control the projector to be in the power-on state under a condition that it is detected that the target signal is not received by the signal receiver, and control the projector to be in the power-off state under a condition that it is detected that the target signal is received by the signal receiver.

Optionally, the target sensor includes a first pressure sensor and a second pressure sensor, the first pressure sensor is arranged at one end of the projector cabin where the opto-mechanical lens is arranged, and the second pressure sensor is arranged at one end of the projector cabin away from the opto-mechanical lens.

Correspondingly, the driving mainboard is configured to: control the working state of the projector to be the power-on state when receiving first pressure information sent by the second pressure sensor; and control the working state of the projector to be the power-off state when receiving second pressure information sent by the first pressure sensor.

The present application provides a method for controlling a projector to power on or off, including: receiving signals collected by a target sensor from one end of a projector cabin where an opto-mechanical lens is arranged and one end of the projector cabin away from the opto-mechanical lens; and controlling a working state of the projector based on the signals, wherein the working state includes a power-on state and a power-off state.

The present application provides a projector, including: a projector cabin; an opto-mechanical lens arranged at one end of the projector cabin; a sliding cover arranged in front of the opto-mechanical lens; a target sensor configured to collect signals from one end of the projector cabin where the opto-mechanical lens is arranged and one end of the projector cabin away from the opto-mechanical lens; and a driving mainboard connected to the target sensor and configured to control a working state of the projector based on the signals, wherein the working state includes a power-on state and a power-off state.

BRIEF DESCRIPTION OF THE DRAWINGS

In order to more clearly describe the technical solutions in embodiments of the present application or the prior art, drawings that need to be used in the description of the embodiments or the prior art will be briefly introduced below. Obviously, drawings in the following description are only embodiments of the present application. For those of ordinary skill in the art, other drawings can be obtained based on the provided drawings without creative work.

DETAILED DESCRIPTION

In order to make the purpose, technical solutions and advantages of the embodiments of the present application clearer, the technical solutions in the embodiments of the present application will be described clearly and completely below in conjunction with the drawings in the embodiments of the present application. Obviously, the described embodiments are a part of the embodiments of the present application, but not all of the embodiments. Based on the embodiments in the present application, all other embodiments obtained by those of ordinary skill in the art without creative work shall fall within a protection scope of the present application.

Figure 1:
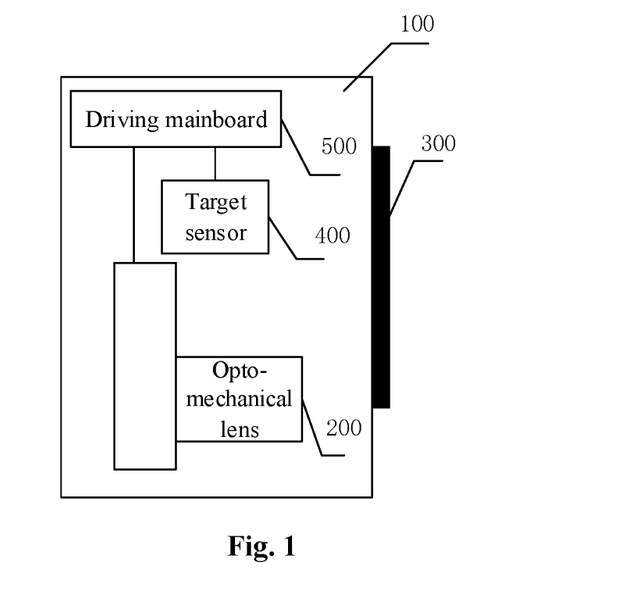
FIG. 1 is a schematic structural diagram of a projector provided by embodiments of the present application.

In related technology, a button or remote control is used to trigger or control the projector to power on or off. The button is easy to be triggered by pressing in the bag, which cannot be avoided. If a fool-proof design is added, for example, the projector is triggered to power on by pressing the button twice consecutively or pressing the button for a long time, although the problem can be solved, user experience is poor under normal use. Based on the above technical problem, the embodiments of the present application provide a projector. Please refer to FIG. 1 for details of the projector. FIG. 1 is a schematic structural diagram of a projector provided by embodiments of the present application, wherein the projector specifically includes: a projector cabin 100; an opto-mechanical lens 200 arranged at one end of the projector cabin 100; a sliding cover 300 arranged in front of the opto-mechanical lens 200; a target sensor 400 configured to collect signals from one end of the projector cabin 100 where the opto-mechanical lens 200 is arranged and one end of the projector cabin 100 away from the opto-mechanical lens 200; and a driving mainboard 500 connected to the target sensor 400 and configured to control a working state of the projector based on the signals, wherein the working state includes a power-on state and a power-off state.

In existing products, for a design of controlling a projector to power on or off through a sliding cover, based on a user feedback, there is a problem that the projector is powered on in a bag due to friction and extrusion in the bag. On one hand, it wastes power and causes poor user experience. On the other hand, if the projector is powered on in the bag, heat dissipation environment is poor, which can easily cause damage to the projector itself, and there is even a fire hazard if a temperature is too high. Therefore, in order to avoid this problem, the current products based on the sliding cover design mostly increase a sliding force of the sliding cover to solve this problem, but this also brings a bad experience, since a user needs to use a greater force to slide the sliding cover to power on.

The embodiments make further explanation with regard to the projector cabin 100. In the embodiments, a size, material, and shape of the projector cabin 100 are not limited, and may be set by a user based on an actual need. It can be understood that the projector cabin 100 includes a cabin corresponding to a mini projector and a cabin corresponding to a conventional projector.

The opto-mechanical lens 200 is not limited in the embodiments. Generally, the opto-mechanical lens 200 is arranged at one end of the projector cabin 100.

In the embodiments, there is arranged the sliding cover 300, and the sliding cover 300 is arranged in front of the opto-mechanical lens 200. A sliding groove is arranged at a position of the projector cabin 100 corresponding to the sliding cover 300, so that the sliding cover 300 may slide in front of the opto-mechanical lens 200. On one hand, the power-on or power-off state may be determined by positioning a position of the sliding cover 300 through the target sensor 400. On the other hand, the sliding cover 300 may also protect the opto-mechanical lens 200 from being worn.

The target sensor 400 will be further elaborated. The embodiments does not limit the target sensor 400, which may be a pressure sensor, an infrared sensor or a TOF sensor, as long as signals from one end of the projector cabin 100 where the opto-mechanical lens 200 is arranged and one end of the projector cabin 100 away from the opto-mechanical lens 200 may be obtained. A method of the obtaining may be direct acquisition or indirect acquisition, as long as the purpose of the embodiments can be achieved. It is worth noting that for different types of target sensors 400, relative positions of the target sensors 400 and the opto-mechanical lens 200 in the projector cabin 100 are different.

The driving mainboard 500 is configured to control the working state of the projector based on the signals, wherein the working state includes the power-on state and the power-off state.

Based on the above technical solutions, the embodiments controls the working state by arranging the target sensor 400 in conjunction with the sliding cover 300. The target sensor 400 collects signals from one end of the projector cabin 100 where the opto-mechanical lens 200 is arranged and one end of the projector cabin 100 away from the opto-mechanical lens 200. One signal is obtained when the sliding cover 300 is at one end of the projector cabin 100 away from the opto-mechanical lens 200, and another signal is obtained when the sliding cover 300 is at one end of the projector cabin 100 where the opto-mechanical lens 200 is arranged, so that the driving mainboard 500 controls the working state based on the signals, which greatly reduces an occurrence of false triggering and improves user experience.

Based on the above embodiments, the embodiments provides another projector. Please refer to FIG. 2, which is a schematic diagram of a front view of another projector provided by embodiments of the present applications, wherein the target sensor 400 is a ranging sensor and includes three components, wherein any two components 400-1, 400-2 of the components are arranged in a preset range from two sides of the opto-mechanical lens 200 respectively, the last component 400-3 is arranged at one end of the projector cabin 100 away from the opto-mechanical lens 200, and the three components are a signal transmitting tube, a first signal receiving tube, and a second signal receiving tube. The driving mainboard 500 is configured to: when the signal transmitting tube transmits a preset signal, control the working state based on detecting whether the preset signal is received by the first signal receiving tube and the second signal receiving tube.

Figure 2:
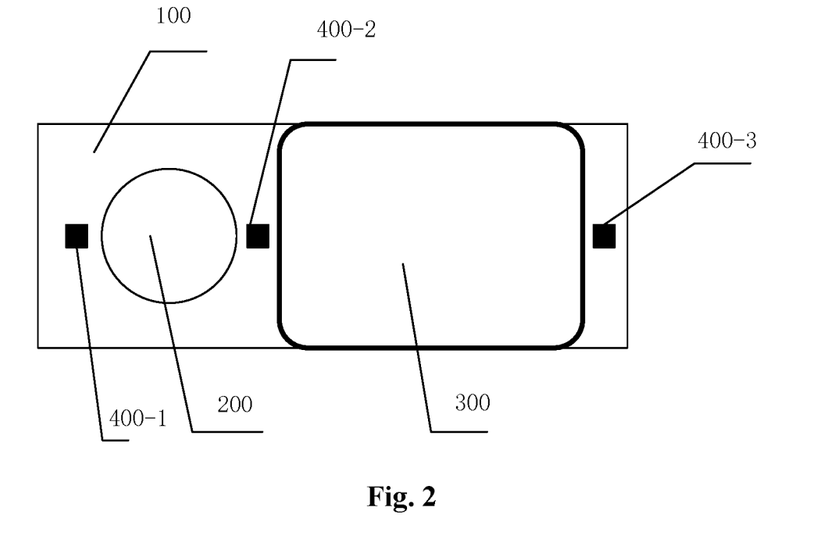
FIG. 2 is a schematic diagram of a front view of another projector provided by embodiments of the present application.

It can be understood that the first signal receiving tube and the second signal receiving tube are not limited in the embodiments, and may be replaced with each other. For example, in an achievable implementation, the first signal receiving tube may be a signal receiving tube a, and the second signal receiving tube may be a signal receiving tube b; in another achievable implementation, the first signal receiving tube may be the signal receiving tube b, and the second signal receiving tube may be the signal receiving tube a.

In the embodiments, the driving mainboard 500 controls the working state based on detecting whether the preset signal is received by the first signal receiving tube and the second signal receiving tube. In an achievable implementation, whether the preset signal is received indicates whether there is a valid signal, that is, the working state is controlled based on whether the preset signal is received by the first signal receiving tube and the second signal receiving tube. In another achievable implementation, the received preset signal indicates a distance signal, whether the projector is in a small space is determined based on a distance value corresponding to the distance signal for the first signal receiving tube and the second receiving tube. If the projector is in a small space, which indicates that there is false triggering, then the working state is controlled to be the power-off state. If the projector is not in a small space, whether the working state is the power-off state or the power-on state is determined based on whether the preset signal is received by the first signal receiving tube and the second receiving tube. Of course, there may be other forms, and details will not described in the embodiments.

It can be understood that the projector provided by the embodiments includes a projector cabin 100, an opto-mechanical lens 200, a driving mainboard 500, and of course also includes a cooling system, a power amplifier system, and the like. By arranging the sliding cover in front of the opto-mechanical lens 200, on one hand, sliding of the sliding cover 300 may be controlled to control the projector to power on, and on the other hand, the sliding cover may protect the opto-mechanical lens 200 to a certain extent. In this solution, the sliding cover design and a TOF ranging sensor cooperate to control the power-on or power-off state of the projector. The TOF ranging sensor includes a signal transmitting tube and two signal receiving tubes. An initialization, switching of working modes, and data reading of the TOF device are completed by relevant functional modules on the driving mainboard 500. TOF ranging is to measure a distance between two points by using a flight time of a data signal to travel back and forth between a pair of transceivers. A time interval between sending out the data signal from a transmitting end and receiving a response signal from a receiving end by the transmitting end is recorded as Tt, and a time interval between receiving the data signal from the transmitting end by the receiving end and sending out the response signal from the receiving end is recorded as Tr. A one-way flight time of the signal to travel between the pair of transceivers is Tf=(Tt−Tr)/2, then the distance between the two points d=c*Tf, where c represents an electromagnetic wave propagation speed. This patent uses this technology to measure distance data.

In the embodiments, the signal transmitting tube includes, but not limited to, an infrared transmitter, a laser transmitter, and a millimeter wave radar transmitter. The preset range is not limited in the present application, as long as it is within a short distance from two sides of the opto-mechanical lens 200, wherein the short distance may be 1 cm, 3 cm, 5 cm or other distances as long as the purpose of the embodiments can be achieved.

In an achievable implementation, the signal transmitting tube and the first signal receiving tube are arranged in the preset range from two sides of the opto-mechanical lens 200 respectively, and the second signal receiving tube is arranged at one end of the projector cabin 100 away from the opto-mechanical lens 200. Correspondingly, the driving mainboard 500 is configured to: when the signal transmitting tube transmits the preset signal, control the projector to be in the power-on state under a condition that it is detected that the preset signal is received by the first signal receiving tube and the preset signal is not received by the second signal receiving tube, and control the projector to be in the power-off state under a condition that it is detected that the preset signal is not received by the first signal receiving tube. In an achievable implementation, a length of the sliding cover is smaller than a corresponding distance between the second signal receiving tube and a component with a closest horizontal distance to the second signal receiving tube. In another achievable implementation, a length of the sliding cover is equal to a corresponding distance between the second signal receiving tube and a component with a closest horizontal distance to the second signal receiving tube.

There are two ways for the technical solutions mentioned above. For the first way, the signal transmitting tube and the first signal receiving tube are arranged in the preset range from two sides of the opto-mechanical lens 200 respectively, wherein the first signal receiving tube is arranged at one end of the projector cabin 100 close to the opto-mechanical lens 200, and the second signal receiving tube is arranged at one end of the projector cabin 100 away from the opto-mechanical lens 200. For example, 400-2 is the signal transmitting tube, 400-1 is the first signal receiving tube, and 400-3 is the second signal receiving tube. At this time, when the driving mainboard 500 detects that the preset signal is received by the first signal receiving tube and the preset signal is not received by the second signal receiving tube, the projector is controlled to be in the power-on state. Further, whether a distance value corresponding to the preset signal received by the first signal receiving tube is greater than a preset threshold may be determined, and if so, it is determined to be in the power-on state, thereby avoiding the occurrence of false triggering in a small space. When the preset signal is received by the second signal receiving tube and the preset signal is not received by the first signal receiving tube, the projector is controlled to be in the power-off state.

For the second way, the signal transmitting tube and the first signal receiving tube are arranged in the preset range from two sides of the opto-mechanical lens 200 respectively, wherein the signal transmitting tube is arranged at one end of the projector cabin 100 close to the opto-mechanical lens 200, and the second signal receiving tube is arranged at one end of the projector cabin 100 away from the opto-mechanical lens 200. For example, 400-1 is the signal transmitting tube, 400-2 is the first signal receiving tube, and 400-3 is the second signal receiving tube. At this time, when the driving mainboard 500 detects that the preset signal is received by the first signal receiving tube and the preset signal is not received by the second signal receiving tube, the projector is controlled to be in the power-on state. Further, whether a distance value corresponding to the preset signal received by the first signal receiving tube is greater than a preset threshold may be determined, and if so, it is determined to be in the power-on state, thereby avoiding the occurrence of false triggering in a small space. When the preset signal is received by the second signal receiving tube and the preset signal is not received by the first signal receiving tube, the projector is controlled to be in the power-off state.

Through a structural design, it is ensured that the signal transmitting tube is not blocked at all times, and the projector may be controlled to power on or off by controlling the TOF device to operate and detect data values for the first signal receiving tube and the second signal receiving tube through the driving mainboard 500. When the sliding cover 300 blocks the opto-mechanical lens 200, the projector is considered to be in the power-off state. Since the first signal receiving tube is blocked by the sliding cover 300, signal information from the signal transmitting tube is received only by the second signal receiving tube. The first signal receiving tube has no data, and the second signal receiving tube may normally acquire a distance between the projector and a projection screen, and then the projector is controlled to be in the power-off state. It can be understood that there is such a situation: when the sliding cover 300 does not block the opto-mechanical lens and is not detected in place, both the first signal receiving tube and the second signal receiving tube may receive data at the same time. The first signal receiving tube and the second signal receiving tube may normally acquire the distance between the projector and the projection screen. It can be understood that if the distance is greater than the preset distance, then no operation is performed or the projector is controlled to be in the power-on state, and if the distance is less than the preset distance, then it is determined that the projector is powered on by mistake in a small space, and the projector is controlled to be in the power-off state. When the sliding cover 300 is in place, ranging data is only received by the first signal receiving tube at this time, the first signal receiving tube may normally acquire the distance between the projector and the projection screen, and the second signal receiving tube has no data, and then the projector is controlled to be in the power-on state.

In an achievable implementation, the first signal receiving tube and the second signal receiving tube are arranged in the preset range from two sides of the opto-mechanical lens 200 respectively, and the signal transmitting tube is arranged at one end of the projector cabin 100 away from the opto-mechanical lens 200. Correspondingly, the driving mainboard is configured to: when the signal transmitting tube transmits the preset signal, control the projector to be in the power-off state under a condition that it is detected that the preset signal is not received by the first signal receiving tube or the second signal receiving tube, and control the projector to be in the power-on state under a condition that it is detected that the preset signal is received by both the first signal receiving tube and the second signal receiving tube and the sliding cover does not block the signal transmitting tube.

For example, 400-3 is the signal transmitting tube, 400-1 is the first signal receiving tube, and 400-2 is the second signal receiving tube. At this time, the projector is controlled to be in the power-off state under a condition that it is detected that the preset signal is not received by the first signal receiving tube or the second signal receiving tube, and the projector is controlled to be in the power-on state under a condition that it is detected that the preset signal is received by both the first signal receiving tube and the second signal receiving tube and the sliding cover does not block the signal transmitting tube. Specifically, when the first signal receiving tube is a signal receiving tube A and the second signal receiving tube is a signal receiving tube B, if the signal receiving tube B is blocked, the preset signal is not received by the signal receiving tube B, and the projector is controlled to be in the power-off state at this time. If both the signal receiving tube A and the signal receiving tube B are blocked, the preset signal is not received by the signal receiving tube A. It can be understood that if the preset signal is not received by the signal receiving tube A, then the preset signal is definitely not received by the signal receiving tube B, therefore, the preset signal is not received by the signal receiving tube A, and the projector is controlled to be in the power-off state at this time. When the first signal receiving tube is the signal receiving tube B and the second signal receiving tube is the signal receiving tube A, if the signal receiving tube A is blocked, the preset signal is not received by the signal receiving tube A, and the projector is controlled to be in the power-off state at this time. If both the signal receiving tube B and the signal receiving tube A are blocked, the preset signal is not received by the signal receiving tube B. It can be understood that if the preset signal is not received by the signal receiving tube B, then the preset signal is definitely not received by the signal receiving tube A, therefore, the preset signal is not received by the signal receiving tube B, and the projector is controlled to be in the power-off state at this time.

As can be seen, by using a TOF principle ranging method, the preset signal for the first signal receiving tube and the second signal receiving tube and a state and value of data corresponding to the preset signal are detected as a reference to control the projector to power on or off. Of course, at the same time, the above method may also be used to cooperate with a remote control to control the projector to power on, which can ensure that a function of power-on or power-off is normal while avoiding an abnormal power-on situation, such as powering on in a bag due to false triggering. A main process is as follows: the TOF is controlled by the driving mainboard to continuously measure distance data, to determine which state a test projector is in, and perform a corresponding operation. When there is an obstruction, it is mainly to prevent the projector from powering on in a bag or in a small space. In this case, R1 still has distance data, but the distance is very close. It may be determined that the projector is in a bag by distinguishing a size of the data, and thus the projector is not turned on.

The embodiments provides another projector. For details, FIG. 2 may also be referred to. The target sensor 400 is a ranging sensor and includes three components, wherein any two components 400-1, 400-2 of the components are arranged in a preset range from two sides of the opto-mechanical lens 200 respectively, the last component 400-3 is arranged at one end of the projector cabin 100 away from the opto-mechanical lens 200, 400-1 is a signal receiving tube, 400-2 is a first signal transmitting tube, and 400-3 is a second signal transmitting tube. The driving mainboard 500 is configured to: when the first signal transmitting tube and the second signal transmitting tube transmit a preset signal, control the working state based on detected preset signal. The preset signal includes identification information of a signal transmitting tube. When the preset signal of the first signal transmitting tube is detected and the preset signal of the second signal transmitting tube is not detected, the projector is controlled to be in the power-on state. When the preset signal of the second signal transmitting tube is detected and the preset signal of the first signal transmitting tube is not detected, the projector is controlled to be in the power-off state. Further, when the preset signal of the first signal transmitting tube is detected and the preset signal of the second signal transmitting tube is not detected, and a distance corresponding to the preset signal of the first signal transmitting tube is greater than a preset distance, the projector is controlled to be in the power-on state.

The embodiments provides another projector. The target sensor 400 is a ranging sensor, and includes a signal receiver and a signal transmitter, and the signal receiver and the signal transmitter are arranged in a preset range from two sides of the opto-mechanical lens 200 respectively. Correspondingly, the driving mainboard 500 is configured to: when the signal transmitter transmits a target signal, control the projector to be in the power-on state under a condition that it is detected that the target signal is not received by the signal receiver, and control the projector to be in the power-off state under a condition that it is detected that the target signal is received by the signal receiver.

The embodiments provides another projector. The target sensor 400 includes a first pressure sensor and a second pressure sensor, the first pressure sensor is arranged at one end of the projector cabin 100 where the opto-mechanical lens 200 is arranged, and the second pressure sensor is arranged at one end of the projector cabin 100 away from the opto-mechanical lens 200. Correspondingly, the driving mainboard 500 is configured to: control the working state of the projector to be the power-on state when receiving first pressure information sent by the second pressure sensor; and control the working state of the projector to be the power-off state when receiving second pressure information sent by the first pressure sensor.

Figure 3:
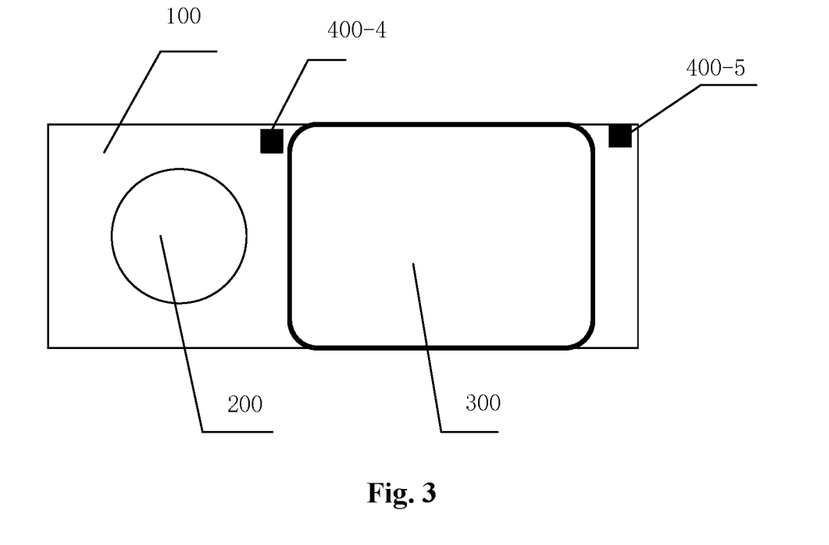
FIG. 3 is a schematic structural diagram of another projector provided by embodiments of the present application.

Referring to FIG. 3, which is a schematic structural diagram of another projector provided by embodiments of the present application. The target sensor 400 includes a first pressure sensor 400-4 and a second pressure sensor 400-5, the first pressure sensor 400-4 is arranged at one end of the projector cabin 100 where the opto-mechanical lens 200 is arranged, and the second pressure sensor 400-5 is arranged at one end of the projector cabin 100 away from the opto-mechanical lens 200.

Correspondingly, the working state of the projector is controlled to be the power-on state when receiving first pressure information sent by the second pressure sensor; and the working state of the projector is controlled to be the power-off state when receiving second pressure information sent by the first pressure sensor.

Figure 4:
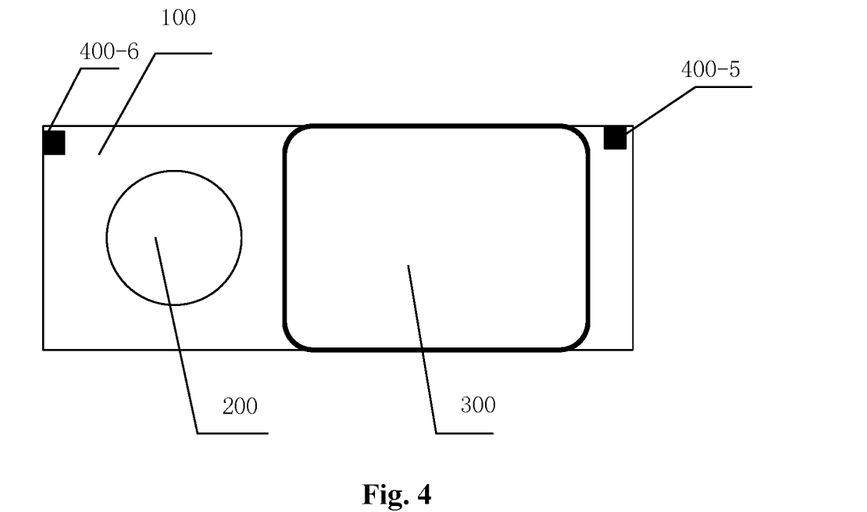
FIG. 4 is a schematic structural diagram of another projector provided by embodiments of the present application.

Referring to FIG. 4, which is a schematic structural diagram of another projector provided by embodiments of the present application. The target sensor 400 includes a first pressure sensor 400-6 and a second pressure sensor 400-5, the first pressure sensor 400-6 is arranged at one end of the projector cabin 100 where the opto-mechanical lens 200 is arranged, and the second pressure sensor 400-5 is arranged at one end of the projector cabin 100 away from the opto-mechanical lens 200.

Correspondingly, the working state of the projector is controlled to be the power-on state when receiving first pressure information sent by the second pressure sensor; and the working state of the projector is controlled to be the power-off state when receiving second pressure information sent by the first pressure sensor.

Figure 5:
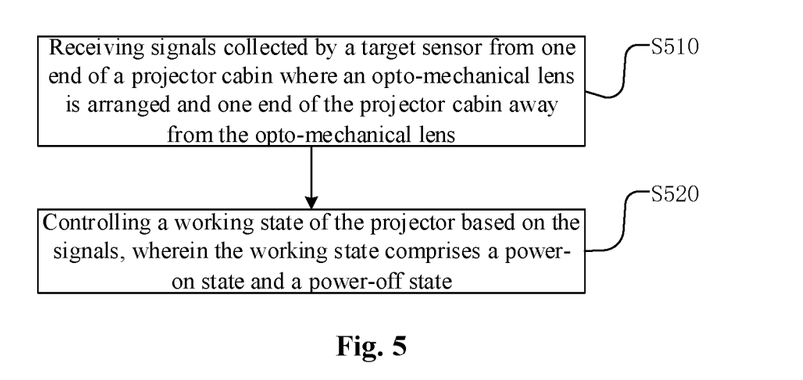
FIG. 5 is a schematic flowchart of a method for controlling a projector to power on or off provided by embodiments of the present application.

A method for controlling a projector to power on or off provided by embodiments of the present application is introduced below. The method for controlling a projector to power on or off described below and the projector described above may be referred to each other. Referring to FIG. 5, which is a schematic flowchart of a method for controlling a projector to power on or off provided by embodiments of the present application. The method includes steps S510 and S520.

In S510, signals collected by a target sensor from one end of a projector cabin where an opto-mechanical lens is arranged and one end of the projector cabin away from the opto-mechanical lens may be received.

In S520, a working state of the projector is controlled based on the signals, wherein the working state includes a power-on state and a power-off state.

Further, if the target sensor is a ranging sensor and includes three components, wherein any two of the components are arranged in a preset range from two sides of the opto-mechanical lens respectively, the last component is arranged at one end of the projector cabin away from the opto-mechanical lens, and the three components are a signal transmitting tube, a first signal receiving tube, and a second signal receiving tube, then the step S520 includes step S521.

In S521, the working state is controlled based on detecting whether a preset signal is received by the first signal receiving tube and the second signal receiving tube.

Further, if the signal transmitting tube and the first signal receiving tube are arranged in the preset range from two sides of the opto-mechanical lens respectively, and the second signal receiving tube is arranged at one end of the projector cabin away from the opto-mechanical lens, then the step S521 includes: controlling the projector to be in the power-on state under a condition that it is detected that the preset signal is received by the first signal receiving tube and the preset signal is not received by the second signal receiving tube; and controlling the projector to be in the power-off state under a condition that it is detected that the preset signal is not received by the first signal receiving tube.

Further, controlling the projector to be in the power-on state under a condition that it is detected that the preset signal is received by the first signal receiving tube and the preset signal is not received by the second signal receiving tube includes: under a condition that it is detected that the preset signal is received by the first signal receiving tube and the preset signal is not received by the second signal receiving tube, determining whether a distance corresponding to the preset signal received by the first signal receiving tube is greater than a preset distance; and controlling the projector to be in the power-on state under a condition that the distance is greater than the preset distance.

Further, controlling the projector to be in the power-on state under a condition that it is detected that the preset signal is received by the first signal receiving tube and the preset signal is not received by the second signal receiving tube includes: controlling the projector to be in the power-off state under a condition that it is detected that the preset signal is not received by the first signal receiving tube or the second signal receiving tube; and controlling the projector to be in the power-on state under a condition that it is detected that the preset signal is received by both the first signal receiving tube and the second signal receiving tube and the sliding cover does not block the signal transmitting tube.

Further, if the target sensor is a ranging sensor and includes a signal receiver and a signal transmitter, and the signal receiver and the signal transmitter are arranged in a preset range from two sides of the opto-mechanical lens respectively, then the step S520 includes: when the signal transmitter transmits a target signal, controlling the projector to be in the power-on state under a condition that it is detected that the target signal is not received by the signal receiver, and controlling the projector to be in the power-off state under a condition that it is detected that the target signal is received by the signal receiver.

Further, if the target sensor includes a first pressure sensor and a second pressure sensor, the first pressure sensor is arranged at one end of the projector cabin where the opto-mechanical lens is arranged, and the second pressure sensor is arranged at one end of the projector cabin away from the opto-mechanical lens, then the step S520 includes: controlling the working state of the projector to be the power-on state when receiving first pressure information sent by the second pressure sensor; and controlling the working state of the projector to be the power-off state when receiving second pressure information sent by the first pressure sensor.

Since embodiments of the method for controlling a projector to power on or off and embodiments of the projector correspond to each other, please refer to the description of the embodiments of the projector for the embodiments of the method for controlling a projector to power on or off, which will not be repeated herein.

Various embodiments in the description are described in a progressive manner, and each embodiment focuses on differences from other embodiments, and the same or similar parts among various embodiments may be referred to each other. For the device disclosed in the embodiments, since it corresponds to the method disclosed in the embodiments, the description is relatively simple, and relevant parts can refer to the description of the method.

Those skilled in the art may further realize that units and algorithm steps of various examples described in conjunction with the embodiments disclosed herein can be implemented in electronic hardware, a computer software, or a combination of both. In order to clearly illustrate an interchangeability of hardware and software, a composition and steps of each example have been generally described in the above description in accordance with functions. Whether these functions are executed by hardware or software depends on a specific application and design constraint condition of technical solutions. Those skilled in the art can use different methods for each specific application to implement the described functions, however, such implementation should not be considered to go beyond the scope of the present application.

Steps of the method or algorithms described in conjunction with the embodiments disclosed herein can be directly implemented in hardware, a software module executed by a processor, or a combination of both. The software module may be arranged in a random access memory (RAM), an internal memory, a read-only memory (ROM), an electrically programmable ROM, an electrically erasable programmable ROM, a register, a hard disk, a removable disk, a CD-ROM, or any other forms of storage media known in the art.

Technical solutions provided by the present application are described in detail above. Specific examples are used herein to illustrate principles and implementation of the present application. The description of the above embodiments is only used to help understand the method and core ideas of the present application. It should be pointed out that, for those of ordinary skill in the art, without departing from the principles of the present application, several improvements and modifications can be made to the present application, and these improvements and modifications also fall within a protection scope of the claims of the present application.

What is claimed is:

1. A projector, comprising:
   a projector cabin;
   an opto-mechanical lens arranged at one end of the projector cabin;
   a sliding cover arranged in front of the opto-mechanical lens;
   a target sensor configured to collect signals from one end of the projector cabin where the opto-mechanical lens is arranged and one end of the projector cabin away from the opto-mechanical lens; and
   a driving mainboard connected to the target sensor and configured to control a working state of the projector based on the signals, wherein the working state comprises a power-on state and a power-off state,
   wherein the target sensor is a ranging sensor and comprises three components, wherein any two of the components are arranged in a preset range from two sides of the opto-mechanical lens respectively, the last component is arranged at one end of the projector cabin away from the opto-mechanical lens, and the three components are a signal transmitting tube, a first signal receiving tube, and a second signal receiving tube;
   correspondingly, the driving mainboard is configured to:
   when the signal transmitting tube transmits a preset signal, control the working state based on detecting whether the preset signal is received by the first signal receiving tube and the second signal receiving tube.

2. The projector according to claim 1, wherein the signal transmitting tube and the first signal receiving tube are arranged in the preset range from two sides of the opto-mechanical lens respectively, and the second signal receiving tube is arranged at one end of the projector cabin away from the opto-mechanical lens;

correspondingly, the driving mainboard is configured to: when the signal transmitting tube transmits the preset signal, control the projector to be in the power-on state under a condition that it is detected that the preset signal is received by the first signal receiving tube, and control the projector to be in the power-off state under a condition that it is detected that the preset signal is not received by the first signal receiving tube.

3. The projector according to claim 2, wherein a length of the sliding cover is smaller than a corresponding distance between the second signal receiving tube and a component with a closest horizontal distance to the second signal receiving tube.

4. The projector according to claim 2, wherein the driving mainboard is configured to: under a condition that it is detected that the preset signal is received by the first signal receiving tube and the preset signal is not received by the second signal receiving tube, determine whether a distance corresponding to the preset signal received by the first signal receiving tube is greater than a preset distance, and control the projector to be in the power-on state under a condition that the distance is greater than the preset distance.

5. The projector according to claim 1, wherein the first signal receiving tube and the second signal receiving tube are arranged in the preset range from two sides of the opto-mechanical lens respectively, and the signal transmitting tube is arranged at one end of the projector cabin away from the opto-mechanical lens;
correspondingly, the driving mainboard is configured to: when the signal transmitting tube transmits the preset signal, control the projector to be in the power-off state under a condition that it is detected that the preset signal is not received by the first signal receiving tube or the second signal receiving tube, and control the projector to be in the power-on state under a condition that it is detected that the preset signal is received by both the first signal receiving tube and the second signal receiving tube and the sliding cover does not block the signal transmitting tube.

6. The projector according to claim 1, wherein the signal transmitting tube is an infrared transmitter, a laser transmitter, or a millimeter wave radar transmitter.

7. A projector, comprising:
a projector cabin;
an opto-mechanical lens arranged at one end of the projector cabin;
a sliding cover arranged in front of the opto-mechanical lens;
a target sensor configured to collect signals from one end of the projector cabin where the opto-mechanical lens is arranged and one end of the projector cabin away from the opto-mechanical lens; and
a driving mainboard connected to the target sensor and configured to control a working state of the projector based on the signals, wherein the working state comprises a power-on state and a power-off state,
wherein the target sensor is a ranging sensor and comprises a signal receiver and a signal transmitter, the signal receiver and the signal transmitter are arranged in a preset range from two sides of the opto-mechanical lens respectively, and correspondingly, the driving mainboard is configured to: when the signal transmitter transmits a target signal, control the projector to be in the power-on state under a condition that it is detected that the target signal is not received by the signal receiver, and control the projector to be in the power-off state under a condition that it is detected that the target signal is received by the signal receiver; or
the target sensor comprises a first pressure sensor and a second pressure sensor, the first pressure sensor is arranged at one end of the projector cabin where the opto-mechanical lens is arranged, the second pressure sensor is arranged at one end of the projector cabin away from the opto-mechanical lens, and correspondingly, the driving mainboard is configured to: control the working state of the projector to be the power-on state when receiving first pressure information sent by the second pressure sensor; and control the working state of the projector to be the power-off state when receiving second pressure information sent by the first pressure sensor.

8. A method for controlling a projector to power on or off, comprising: receiving signals collected by a target sensor from one end of a projector cabin where an opto-mechanical lens is arranged and one end of the projector cabin away from the opto-mechanical lens; and
controlling a working state of the projector based on the signals, wherein the working state comprises a power-on state and a power-off state,
wherein the target sensor is a ranging sensor and comprises three components, wherein any two of the components are arranged in a preset range from two sides of the opto-mechanical lens respectively, the last component is arranged at one end of the projector cabin away from the opto-mechanical lens, and the three components are a signal transmitting tube, a first signal receiving tube, and a second signal receiving tube, and correspondingly, controlling a working state of the projector based on the signals comprises: when the signal transmitting tube transmits a preset signal, controlling the working state based on detecting whether the preset signal is received by the first signal receiving tube and the second signal receiving tube; or
the target sensor is a ranging sensor and comprises a signal receiver and a signal transmitter, the signal receiver and the signal transmitter are arranged in a preset range from two sides of the opto-mechanical lens respectively, and correspondingly, controlling a working state of the projector based on the signals comprises: when the signal transmitter transmits a target signal, controlling the projector to be in the power-on state under a condition that it is detected that the target signal is not received by the signal receiver, and controlling the projector to be in the power-off state under a condition that it is detected that the target signal is received by the signal receiver; or
the target sensor comprises a first pressure sensor and a second pressure sensor, the first pressure sensor is arranged at one end of the projector cabin where the opto-mechanical lens is arranged, the second pressure sensor is arranged at one end of the projector cabin away from the opto-mechanical lens, and correspondingly, controlling a working state of the projector based on the signals comprises: controlling the working state of the projector to be the power-on state when receiving first pressure information sent by the second pressure sensor; and controlling the working state of the projector to be the power-off state when receiving second pressure information sent by the first pressure sensor.

* * * * *